(12) United States Patent
Lamont et al.

(10) Patent No.: US 6,935,363 B2
(45) Date of Patent: Aug. 30, 2005

(54) PRESSURE CONTROL SYSTEM FOR LOW PRESSURE OPERATION

(75) Inventors: Gordon John Lamont, New Westminster (CA); Chad Comeault, Vancouver (CA); Roger William Harper, North Saanich (CA)

(73) Assignee: Hydrogenics Corporation, Mississauga (CA)

( * ) Notice: Subject to any disclaimer, the term of this patent is extended or adjusted under 35 U.S.C. 154(b) by 0 days.

(21) Appl. No.: 10/716,553

(22) Filed: Nov. 20, 2003

(65) Prior Publication Data

US 2004/0182444 A1 Sep. 23, 2004

Related U.S. Application Data (60) Provisional application No. 60/427,534, filed on Nov. 20, 2002, and provisional application No. 60/516,283, filed on Nov. 3, 2003.

(51) Int. Cl.$^7$ .............................................. G05D 16/18
(52) U.S. Cl. ...................... 137/492; 137/489.5; 251/29; 251/117
(58) Field of Search .............................. 137/489.5, 492; 251/24, 29, 117, 331

(56) References Cited

U.S. PATENT DOCUMENTS

| | | | | |
|---|---|---|---|---|
| 5,047,965 A | * | 9/1991 | Zlokovitz | ................... 700/282 |
| 5,460,196 A | * | 10/1995 | Yonnet | ........................ 137/12 |
| 6,148,956 A | | 11/2000 | Iwatsuki | |
| 6,776,180 B1 | * | 8/2004 | Yonnet | ........................ 137/14 |

FOREIGN PATENT DOCUMENTS

| | | | |
|---|---|---|---|
| EP | 1 205 993 | | 5/2002 |
| FR | 1 110 070 | | 2/1956 |
| GB | 2 284 687 A | * | 6/1995 |

* cited by examiner

*Primary Examiner*—Ramesh Krishnamurthy
(74) *Attorney, Agent, or Firm*—Bereskin & Parr (57) ABSTRACT

A pressure control system for controlling the pressure of a process fluid stream at a certain location having a pressure regulator disposed in the process fluid stream, through which the process fluid stream flows. A first pilot controller senses the pressure of the process fluid at the location and receives a control pressure from a control source. A second pilot controller receives the control pressure from the control source and provides added pressure. An inspirator receives the added pressure from the second pilot controller and generates a differential pressure. The differential pressure is used to control the pressure of the process fluid stream within the pressure regulator. The pressure regulator comprises a first chamber and a second chamber therein separated by a flexible element and a divider is disposed in the first chamber and operative to abut against the flexible element to divide the first chamber into separate spaces. Preferably, the pressure regulator is disposed such that the flexible element extends substantially in vertical direction and the divider extends substantially in horizontal direction.

11 Claims, 5 Drawing Sheets

FIG. 1

Prior Art

PRESSURE CONTROL SYSTEM FOR LOW PRESSURE OPERATION

FIELD OF THE INVENTION

The present invention relates generally to a pressure control system. More particularly, the present invention relates to a pressure control system for low pressure operation.

BACKGROUND OF THE INVENTION

In various industrial applications, it is often desirable to accurately control the pressure of a process fluid stream at a certain point in an industrial system. The process fluid can be gas, liquid, or mixture thereof. For example, in a fuel cell system or a fuel cell testing system, it is necessary to operate the fuel cell under a controlled pressure condition. A common technique is to control the pressure of a process fluid stream adjacent the inlet of the fuel cell for that process fluid stream. To this end, a pressure regulator is often utilized to control the pressure at this point.

A known pressure control system comprises an unloading type flexible element pressure regulator and a piloting system. The pressure regulator is disposed in the process fluid stream line and in operation, allows the process fluid to flow through a chamber thereof disposed on one side of the flexible element, e.g. a diaphragm. A pilot controller senses the pressure at the point where the pressure of the process fluid stream is to be accurately controlled, and correspondingly controls the pressure of another chamber on the other side of the flexible element of the pressure regulator, thereby eventually balancing the pressure on both sides of the flexible element. By manually adjusting the preset pressure of the pilot controller, the pressure of the process fluid stream at the desired point can be controlled. Such pressure regulator and the piloting system and the way they are operated are commercially available from, for example, Mooney Controls.

However, it has been found that this type of pressure control system cannot meet the increasingly strict requirement in terms of accuracy and stability, when a system operates at low pressure, e.g. less than 7 psig, partly because that the pressure regulator needs a certain pressure drop across it to activate the pressure balancing mechanism and such pressure drop is often not available when pressure of the process fluid stream is extremely low.

Therefore, there remains a need for a pressure control system that accurately controls the pressure of a process fluid stream at a certain point, under a range of pressure conditions including very low pressure of the process fluid stream.

SUMMARY OF THE INVENTION

In accordance with the present invention, there is provided a pressure control system for controlling the pressure of a process fluid stream at a certain location, comprising: (a) a pressure regulator mounted downstream of an upstream process fluid line, the regulator having a closure member movable between open and closed positions for controlling process fluid flow through the fluid line, and a control chamber for housing an actuator fluid for acting on the closure member, wherein the position of the closure member changes in response to changes in the pressure of the actuator fluid housed in the control chamber; (b) an inspirator having an inlet, an outlet, and a throat between the inlet and outlet, the control chamber of the regulator being in flow communication with the throat of the inspirator; (c) a primary pilot valve, including a sense port for receiving a sensed fluid pressure of the process fluid stream, a first target port for inputting a first target pressure, an inlet port for the actuator fluid in fluid communication with the outlet of the inspirator, an outlet port, and a primary valve member controlling the flow of actuator fluid between the inlet and outlet ports thereof and exiting the outlet of the inspirator, a first target pressure chamber in fluid communication with the target port and a sensed pressure chamber in fluid communication with the sense port, and a mechanism configured to move the primary valve member in response to a pressure differential between the target and sensed pressure chambers, wherein the sensed pressure chamber is in fluid communication with a sensing point along the process fluid line at which the pressure of the process fluid is to be controlled; (d) a secondary pilot valve, including an inlet port connectible to a supply of the actuator fluid, an outlet port, a sense port connected to the outlet port, and a second target port for inputting a second target pressure, a secondary valve member mounted for controlling the supply of actuator fluid to the inspirator inlet by controlling the flow of the actuator fluid between the inlet and the outlet ports thereof a target pressure chamber and a sensed pressure chamber, in fluid communication with the second target port and the sense port thereof, and a mechanism configured to move the secondary valve member in response to a pressure differential between the target and sensed pressure chambers; and (e) a target pressure source in fluid communication with the target ports and the target pressure chambers of the primary pilot valve and the secondary pilot valve and adjustable to select a desired pressure to be maintained at the sensing point in the process fluid stream.

BRIEF DESCRIPTION OF THE DRAWING FIGURES

For a better understanding of the present invention, and to show more clearly how it may be carried into effect, reference will now be made, by way of example, to the accompanying drawings, which show a preferred embodiment of the present invention and in which.

DETAILED DESCRIPTION OF THE PREFERRED EMBODIMENT

Figure 1:
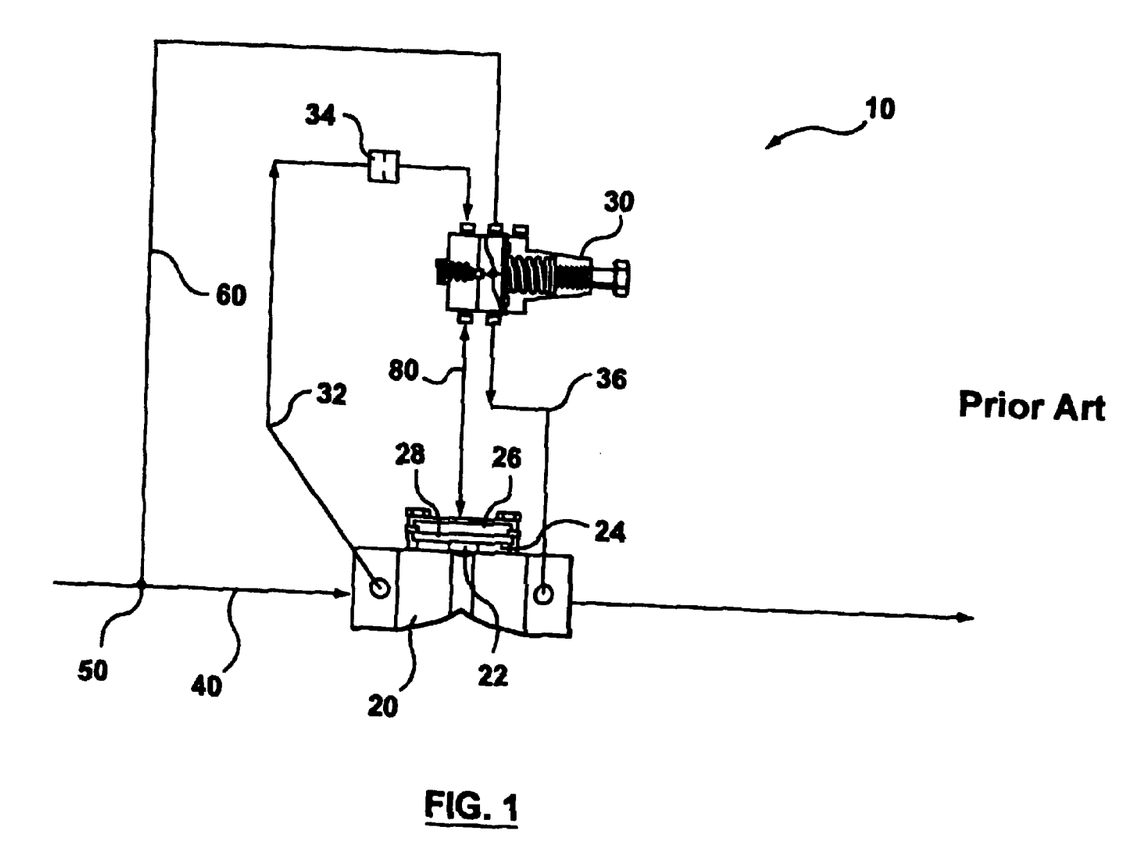
FIG. 1 is a schematic view of a known pressure control system.

A known pressure control system is shown generally at 10 in FIG. 1. The pressure control system 10 comprises an unloading type flexible element pressure regulator 20 and a piloting system. The pressure regulator 20 is disposed in the process fluid stream line 40 and in operation, allows the process fluid to flow through a chamber 24 thereof disposed on one side of the flexible element, e.g. a diaphragm 28. A divider 22 is disposed in the chamber 24 to adjust the pressure therein. The divider 22 initially abuts against the flexible element 28 and hence prevents the process fluid from flowing through the chamber 24. As the process fluid is continuously fed into the chamber 24, pressure in the chamber 24 increases and the diaphragm 28 is lifted. This permits the flow of the process fluid through the chamber 24. A pilot controller 30 senses, via a sense line 60, the pressure at the point 50 where the pressure of the process fluid stream is to be accurately controlled, and correspondingly controls, via a control line 80, the pressure of another chamber 26 on the other side of the flexible element 28 of the pressure regulator 20, thereby eventually balancing the pressure on both sides of the flexible element 28, at a desired pressure. A further line 32, including an orifice or throttle 34 is connected to the pilot controller 30, and an exhaust line 36 is also provided. By manually adjusting the preset pressure of the pilot controller 30, the pressure of the process fluid stream at the desired point 50 can be controlled. As mentioned above, this system needs a pressure differential across the pressure regulator 20 to activate. It is inadequate to achieve accurate pressure control in low pressure conditions.

In use, fluid is supplied through the line 32 and orifice 34 to the pilot controller 30. When too low a pressure is sensed by the controller 30, it is maintained in a closed position, so that flow from the line 32 is directed to the line 80 to maintain the pressure regulator 20 closed, thereby to increase the pressure in the line 40. When sufficient pressure is present in the line 40, this pressure is applied through the sense line 60 to the pilot controller 30 to open the controller against the action of the spring indicated therein. This permits at least part of the flow from line 32 to be exhausted through the exhaust line 36 to the outlet of the pressure regulator 20. Consequently, the pressure on the diaphragm 28 is reduced, permitting the regulator 20 to open, thereby to reduce the pressure in the line 40.

Figure 2:
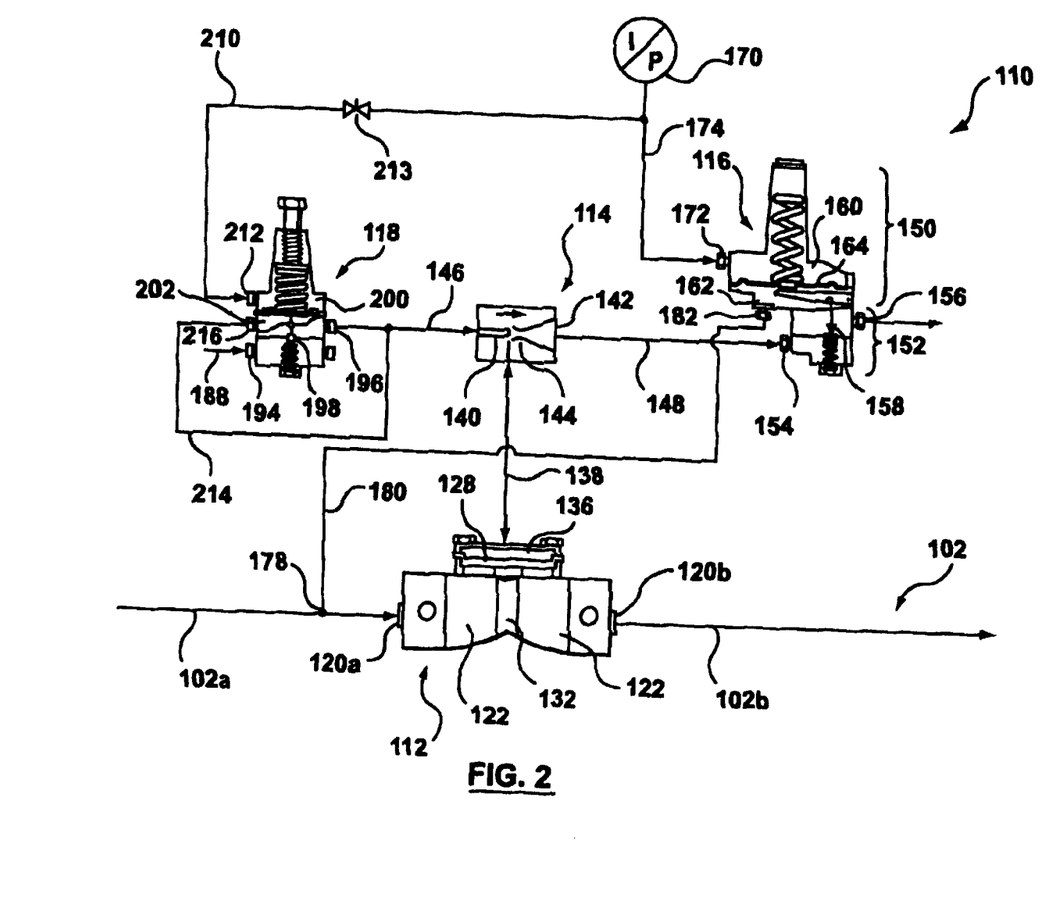
FIG. 2 is a schematic view of an embodiment of a pressure control system according to the present invention.

A pressure control system according to the present invention is shown generally at 110 in FIG. 2. The pressure control system 110 has a pressure regulator 112, an inspirator 114, a primary (low pressure) pilot 116, and a secondary (higher pressure) pilot 118.

Figure 3:
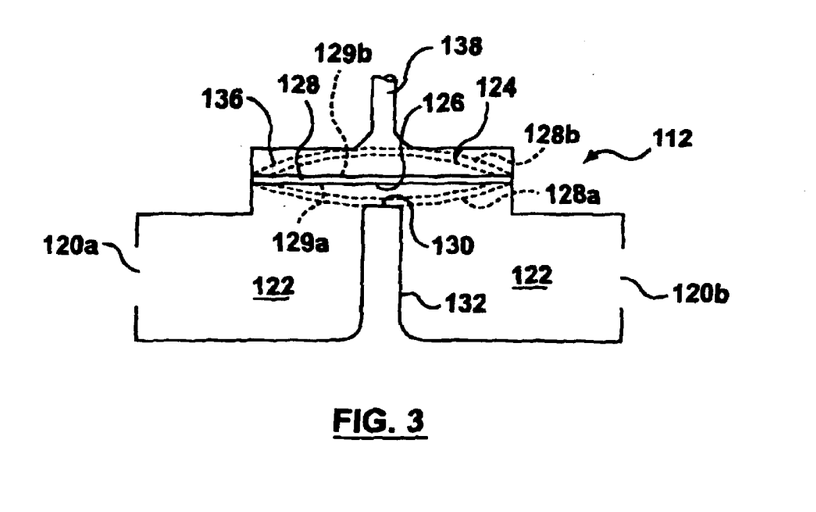
FIG. 3 is an enlarged portion of the schematic view of FIG. 2 showing a regulator in greater detail.

The pressure regulator 112 is mounted in a process fluid line 102 to adjustably control the rate of flow of a fluid through the line 102. More particularly, the regulator 112 has an inlet port 120a in fluid communication with an upstream line 102a of the process fluid line 102, and an outlet port 120b in fluid communication with a downstream line 102b of the process fluid line 102. As best seen in FIG. 3, the regulator 112 is further provided with a flow channel 122 extending between the inlet and outlet ports 120a, 120b and with a closure means 124 in the flow channel 122. The closure means 124 is variably adjustable between a fully closed position, in which the ports 120a and 120b are fluidly isolated from each other, and a fully open position in which a maximum rate of flow is permitted through the flow channel 122.

In the embodiment illustrated, the closure means 124 comprises a sealing surface 126 attached to a flexible actuating diaphragm 128. The diaphragm 128 serves as an actuator for advancing the sealing surface 126 towards, or retracting the sealing surface 126 away from, an engagement surface 130 provided on a divider element 132. The divider element 132 can be in the form of a fixed wall extending into the flow channel 122. When the sealing surface 126 abuts the engagement surface 130, the closure means 124 is in the fully closed position and flow through the channel 122 is denied.

The actuating diaphragm 128 can move in response to a pressure differential across the thickness of the diaphragm 128. Accordingly, in the embodiment illustrated, one face 129a of the diaphragm 128 (i.e. the face with the sealing surface 126) partially defines the flow channel 122, and the opposite face 129b of the diaphragm 128 partially defines a control chamber 136. By controlling pressure in the control chamber 136 relative to that of the flow channel 122, the position of the actuating diaphragm 128, and hence of the closure means 124, can be controlled, and moved between a fully lowered position 128a and a fully raised position 128b (shown in phantom in FIG. 3), corresponding to fully closed and fully open positions of the valve closure means 124. In steady state operation, the pressures in the flow channel 122 and control chamber 136 are equal, and the diaphragm 128 is substantially stationary.

Figure 4:
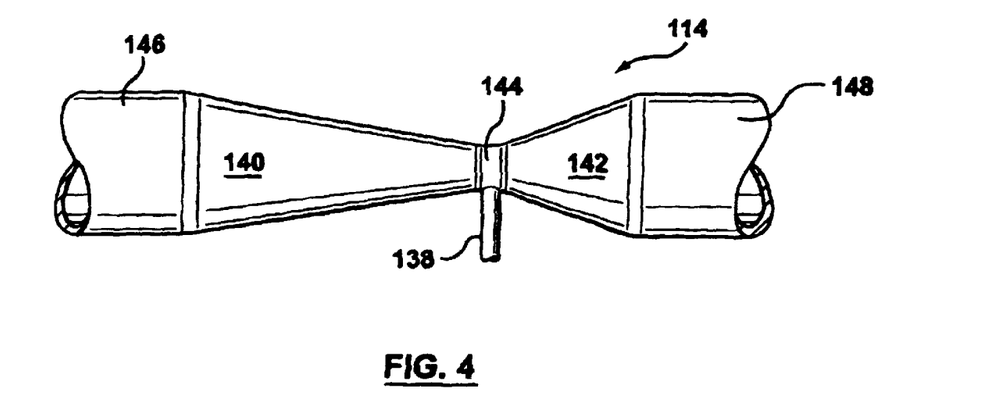
FIG. 4 is an enlarged portion of the schematic view of FIG. 2 showing a inspirator in greater detail.

According to the present invention, the pressure in the control chamber 136 is adjusted by forcing actuator fluid into, or evacuating actuator fluid from, the chamber 136 via a pressure control line 138 that extends between the chamber 136 and the inspirator 114 (FIG. 2). More particularly, the inspirator 114 has, in the form of a venturi, a converging inlet 140, a diverging outlet 142, and a throat 144 between the inlet 140 and outlet 142. The pressure control line 138 extends between the control chamber 136 and the throat 144 of the inspirator 114 (FIG. 4).

The inspirator 114 receives a flow of actuator fluid at its inlet 140 via an inspirator supply line 146, and discharges a flow of actuator fluid from its outlet 142 via an inspirator vent line 148. According to one embodiment of the present invention, the fluid in the supply line 146 is supplied at a relatively constant, higher than target, pressure from a fluid source independent of the process fluid in line 102. The flow of fluid through the inspirator 114 is accelerated in the inspirator, so that a pressure drop is generated at the throat 144 of the inspirator. At a high rate of fluid flow across the inspirator 114 (e.g. unrestricted venting), the pressure drop can generate suction in the control chamber 136 to lift the diaphragm 128 and open the closure member 124. On the other hand, if the venting is restricted, fluid entering the inlet 140 can be directed into the chamber 136, thereby urging the diaphragm 128 downwards and closing the closure member 124.

Figure 5:
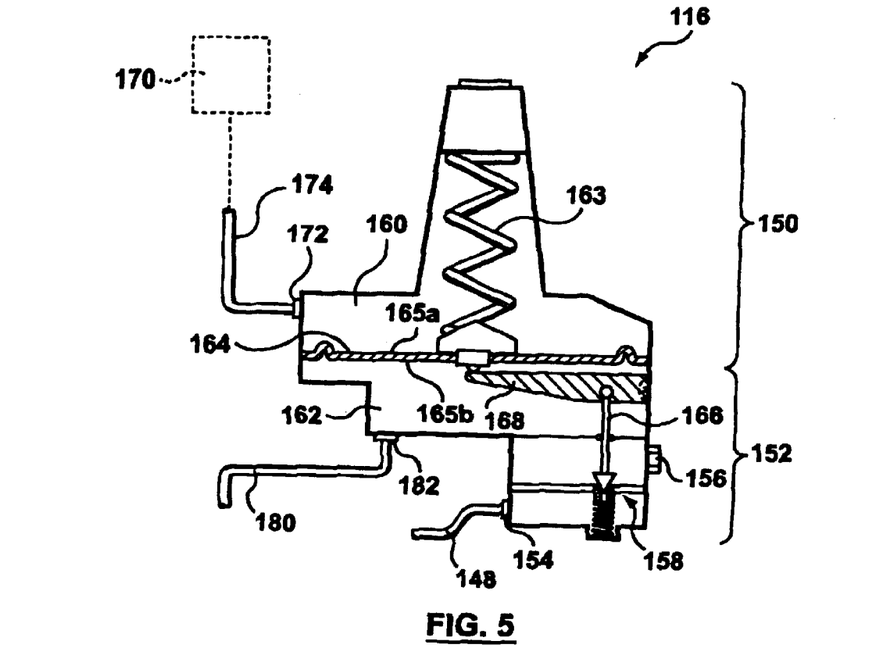
FIG. 5 is an enlarged portion of the schematic view of FIG. 2 showing a primary pilot in greater detail.

With respect to the outlet 142 of the inspirator 114, the outlet 142 is connected to the inspirator vent line 148 to provide fluid communication with the primary (low pressure) pilot 116 for controlled venting of the outlet 142. More particularly, and as best seen in FIG. 5, the primary pilot 116 has a control portion 150 and a valve portion 152, which are in fluid isolation from each other. The valve portion 152 has an inlet port 154, an outlet port 156, and a valve member 158 between the inlet port 154 and outlet port 156. The inspirator vent line 148 connects the outlet 142 of the inspirator 114 to the inlet port 154 of the primary pilot 116. The outlet port 156 is open to atmosphere.

The valve member 158 can move among a fully closed position, a fully open position, and various degrees of partially open positions. In this way, the valve member 158 controls the flow of fluid from the inlet port 154 to the outlet port 156, and hence, the valve portion 152 of the primary pilot 116 controls the flow of fluid from the outlet 142 of the inspirator 114 to atmosphere.

The control portion 150 of the primary pilot 116 adjusts the position of the valve member 158 of the primary pilot 116. The control portion 150 has a target pressure chamber 160 and a sensed pressure chamber 162 that are separated from each other by a primary pilot diaphragm 164. The primary pilot diaphragm 164 has a target pressure face 165a exposed to the target pressure chamber 160, and a sensed pressure face 165b exposed to the sensed pressure chamber 162. A pressure adjustment spring 163 is housed within the target pressure chamber and exerts a force against the target pressure face 165a of the diaphragm 164, as does any fluid pressure in the target pressure chamber 160. By changing the relative pressures in the target and sensed pressure chambers 160, 162, the diaphragm 164 is moved towards one of the chamber 160, 162 dependent on the pressure differential and the load set on the spring 163, which can be adjustable. The valve member 158 is connected to the diaphragm 164 by, for example, a shaft 166 and a lever 168 pivotally mounted as shown, forming a mechanism, so that movement of the diaphragm 164 adjusts the position of the valve member 158. More particularly, a downward movement of the diaphragm 164 (movement towards the sensed pressure chamber 162) closes the valve member 158, and upward movement of the diaphragm 164 (towards the target pressure chamber 160) opens the valve member 158. In the embodiment illustrated, the spring 163 is relatively soft and the surface area of the faces 165a and 165b of the diaphragm 164 are relatively large so that the diaphragm 164 has greater sensitivity to small pressure differentials across the diaphragm 164.

The target pressure chamber 160 of the primary pilot valve 116 is in fluid communication with a target (or control) pressure input 170. More particularly, the control input 170 (FIG. 2) can be a pressurized supply of fluid regulated by, for example, but not limited to, an electronic pressure regulator, and connected to a target port 172 of the target pressure chamber 160 via a control line 174.

The sensed pressure chamber 162 of the primary pilot valve 116 is in fluid communication with a point 178 in the process fluid line 102 where the process pressure is to be controlled. In the embodiment illustrated, the point 178 where the system pressure is to be controlled is located in the upstream line 102a of the process fluid line 102. In other embodiments, the point 178 can be located in other positions of the system, such as, for example, but not limited to, the downstream line 102b of the process fluid line 102. A sense line 180 extends from a sense port 182 of the sensed pressure chamber 162 to an orifice in the line 102 at the point 178. In this way, the pressure of the fluid stream in the line 102 at the point 178 is reflected by the pressure in the sensed pressure chamber 162.

In operation, a pressure drop in the sensed system pressure (i.e. in pressure chamber 162) may be caused by an increase in fluid flow through the regulator 112 (i.e. an increase in fluid consumption by the system). The higher pressure in the target pressure chamber 160 of the pilot 116 presses the diaphragm 164 towards the sensed pressure chamber 162, which therefore moves the valve member 158 to a more closed position. This restricts the flow of fluid from the outlet 142 of the inspirator 114 to the atmosphere, which in turn increases the pressure in the pressure control line 138 and in the pressure control chamber 136. As a result, the actuator diaphragm 128 advances towards the engagement surface 130 of the divider 132, thereby restricting flow through the flow channel 122 of the regulator 112 and increasing the pressure at the sensing point 178.

An increase in the sensed system pressure (at point 178, and in the sensed pressure chamber 162) may be caused by a decrease in fluid flow through the regulator 112 (i.e. a decrease in fluid consumption by the system). The higher pressure in the sensed pressure chamber 162 pushes the pilot diaphragm 164 towards the target pressure chamber 160, so that the valve member 158 is moved to a more open position. This increases the flow of fluid from the outlet 142 of the inspirator 114, which in turn reduces the pressure in the pressure control line 138 and the pressure control chamber 136 of the regulator 112. As a result, the diaphragm 128 retracts away from the engagement surface 130 of the divider 132, which increases flow through the channel 122 and decreases the pressure at the sensing point 178.

Accordingly, in response to a sensed pressure that is either higher or lower than the target pressure, the pressure control system 110 reacts to counteract the pressure deviation.

Further details of the fluid supply to the inlet 140 of the inspirator 114 will now be provided. A supply of actuator fluid through the inspirator supply line 146 can be provided by an independent (or auxiliary) fluid supply 188 that is passed through the secondary (higher pressure) pilot 118. The actuator fluid supply 188 can be a supply of any fluid that is isolated from the process fluid line 102, and is preferably supplied at a pressure greater than the target pressure input 170.

Figure 6:
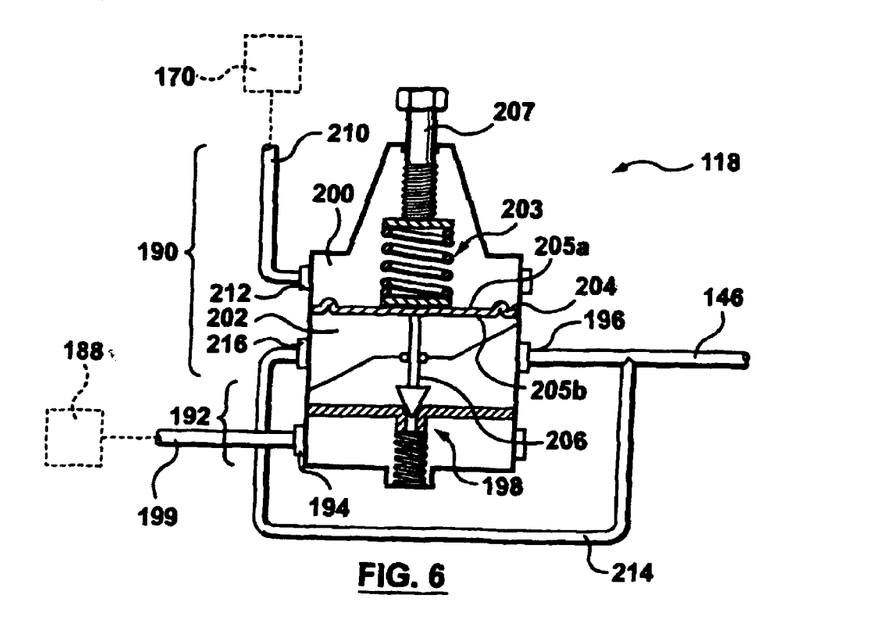
FIG. 6 is an enlarged portion of the schematic view of FIG. 2 showing a secondary pilot in greater detail.

As best seen in FIG. 6, the secondary pilot 118 has a control portion 190 and a valve portion 192, which are fluidly isolated from each other. The valve portion 192 has an inlet port 194 and an outlet port 196, and a valve member 198 between the inlet port 194 and outlet port 196. An auxiliary supply line 199 connects the auxiliary fluid supply 188 to the inlet port 194 of the auxiliary pilot 118. The outlet port 196 is connected to the inspirator supply line 146.

The valve member 198 can move among a fully closed position, a fully open position, and various degrees of partially open positions, so that the valve portion 192 of the secondary pilot 118 controls the flow of fluid from the auxiliary fluid supply 188 to the inlet 140 of the inspirator 114.

The control portion 190 of the secondary pilot 118 adjusts the position of the valve member 198 of the secondary pilot 118. The control portion 190 has a target pressure chamber 200 and a sensed pressure chamber 202 that are separated from each other by a secondary pilot diaphragm 204. The secondary pilot diaphragm 204 has a target pressure face 205a exposed to the target pressure chamber 200, and a sensed pressure face 205b exposed to the sensed pressure chamber 202. A pressure adjustment spring 203 is housed within the target pressure chamber 200 and exerts a force against the target pressure face 205a of the diaphragm 204, as does any fluid pressure in the target pressure chamber 200. The force of the spring 203 can be adjusted by turning an adjustment screw 207 to change the preload on the spring 203. By changing the relative pressures in the target and sensed pressure chambers 200, 202, the diaphragm 204 is moved towards the chamber 200, 202 with the reduced pressure. The valve member 198 can be connected to the diaphragm 204 by a suitable mechanism, for example, a shaft 206, so that movement of the diaphragm 204 adjusts the portion of the valve member 198. In the embodiment illustrated, the spring 203 is relatively stiff and the surface area of the faces 205a and 205b of the diaphragm 204 are relatively small (compared to those of the primary pilot 116).

The target pressure chamber 200 of the secondary pilot valve 118 can be in fluid communication with the control pressure input 170. More specifically, the control (or target) pressure input 170 can be in communication with the chamber 200 via a secondary pilot control line 210 connecting the control line 174 of the primary pilot 116 to a target port 212 of the chamber 200. A stabilizing needle valve 213 can be provided in the secondary pilot control line.

The outlet port 196 of the secondary pilot valve 118 is in fluid communication with the inspirator supply line 146. A sense line 214 extends from a sense port 216 of the sensed pressure chamber 202 to an orifice in the inspirator supply line 146 between the outlet port 196 of the valve portion 192 of the secondary pilot 118 and the inlet 140 of the inspirator 114.

In operation, the auxiliary fluid supply 188 can be supplied to the pressure control system 110, via the line 199, at a pressure that is greater than the target pressure (which is set as desired by the target pressure input 170). Without any additional force exerted on the diaphragm 204 by the spring 203, the fluid pressure to the outlet 196 of the secondary pilot 118 (and hence, the fluid pressure to the inlet 140 of the inspirator 114) is generally equal to the system target pressure. By adjusting the screw 207 to increase the force on the target face 205a of the diaphragm 204, fluid at a higher pressure can be passed to the inspirator. Accordingly, a greater pressure difference can be generated across the diaphragm 128 of the regulator 112.

Referring again to FIG. 1, in known pressure control systems using regulators 20, the regulator 20 is usually positioned so that the diaphragm 28 is facing vertically upwards, or in other words, the diaphragm 28 is generally horizontal having the chamber 26 above and the chamber 24 below. The divider 22 is oriented generally vertically, and a partial gap or flow channel is provided between the top of divider 22 and the bottom of diaphragm 28. The inventors have observed that when a process fluid stream comprises a saturated gas stream, a problem can occur if liquid is condensed in the chamber 24 of the pressure regulator 20. As the gas stream flows through the chamber 24, liquid can condense and accumulate in the upstream side (left side in FIG. 1) of the divider 22 causing partial blockage of the flow passage which can in turn create a significant pressure change in the gas stream. This can result in instability of pressure control and is therefore undesirable.

Figure 7:
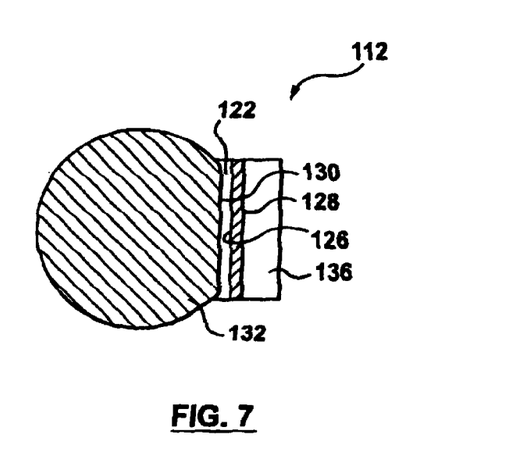
FIG. 7 shows an end view of a portion of the regulator of FIG. 2.
Figure 8:
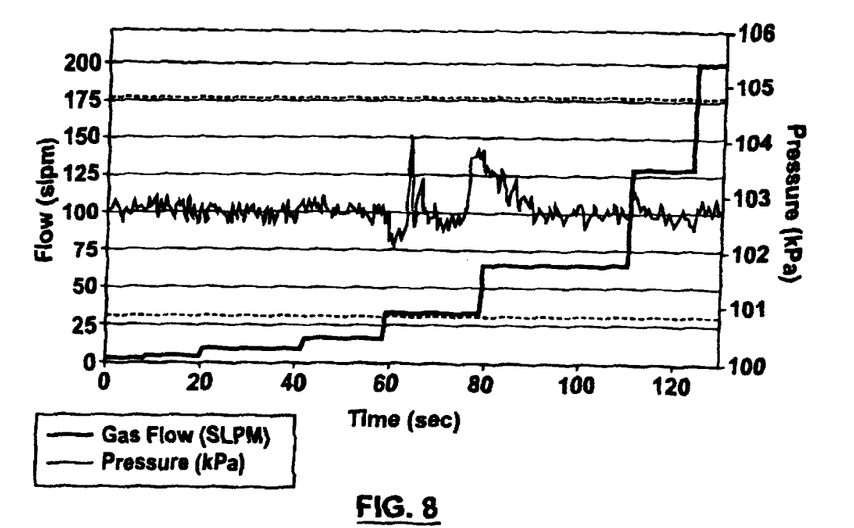
FIG. 8 shows test results of pressure at a fuel cell stack inlet with various process fluid flows using the pressure control system of FIG. 2.

To overcome this problem, the pressure regulator 112 of the control system 110 can be rotated approximately 90 degrees around its axial direction, i.e. the direction of the process fluid stream therethrough (FIG. 7). As a result, during operation, the divider 132 is disposed generally in horizontal position, and the diaphragm 128 extends in a generally vertical direction, with the flow channel 122 on one side and the chamber 136 on the other side. In this configuration, condensed liquid can more easily flow through the flow channel 122 between the surfaces 126 and 130. This can eliminate any significant pressure change due to condensation, so that the pressure of the process gas stream can be controlled constantly at a steady level.

In one application of the pressure control system 110, a fuel cell stack was placed between the pressure control point 178 in the line 102a and the inlet 120a of the pressure regulator. Test results of this example are provided hereinafter. It is to be appreciated, however, that the present system 110 can be used to control pressure of the process fluid stream at any arbitrary location along the process fluid stream line. It is also to be appreciated that the present invention can be applied in many industrial applications, where accurate control of the pressure of a process fluid stream is desirable, especially under low pressure conditions, including but not limited to a fuel cell system.

EXAMPLE

In a test run, the control pressure at inlet 170 was set at about 20 psi. The auxiliary supply stream was provided at about 100 psi. The adjustment screw 207 was adjusted so that the total force exerted on the target pressure face 205a of the diaphragm 204 was equivalent to about 25 psi. A fluid consuming device in the form of a load cell stack was disposed in the upstream fluid line 102a, between the control point and the regulator 112.

FIG. 4–8 shows test results when the present pressure control system in employed in a fuel cell system. As can be seen, although the process gas flow changes dramatically from near zero slpm to 200 slpm, the pressure of the process fluid at a certain point in the system is maintained at reasonably constant level.

While the above description constitutes the preferred embodiments, it will be appreciated that the present invention is susceptible to modification and change without departing from the fair meaning of the proper scope of the accompanying claims.

We claim:

1. A pressure control system for controlling the pressure of a process fluid stream at a certain location, the pressure control system comprising:
  a. a pressure regulator mounted downstream of an upstream process fluid line, the regulator having a closure member movable between open and closed positions for controlling process fluid flow through the fluid line, and a control chamber for housing an actuator fluid for acting on the, closure matter, wherein the position of the closure member changes in repsonse to changes in the pressure of the actuator fluid housed in the control chamber;
  b. an inspirator having an inlet, an outlet, and a throat between the inlet and outlet, the control chamber of the regulator being in flow communication with the throat of the inspirator;
  c. a primary pilot valve, including a sense port for receiving a sensed fluid pressure of the process fluid stream, a first target port for inputting a first target pressure, an inlet port for the actuator fluid in fluid communication with the outlet of the inspirator, an outlet port, and a primary valve member controlling the flow of actuator fluid between the inlet and outlet ports thereof and exiting the outlet of the inspirator, a first target pressure chamber in fluid communication with the target port and a sensed pressure chamber in fluid communication with the sense port, and a mechanism configured to move the primary valve member in response to a pressure differential between the target and sensed pressure chambers, wherein the sensed pressure chamber is in fluid communication with a sensing point along the process fluid line at which the pressure of the process fluid is to be controlled;
  d. a secondary pilot valve, including an inlet port connectible to a supply of the actuator fluid, an outlet port, a sense port connected to the outlet port, and a second target port for inputting a second target pressure, secondary valve member mounted for controlling the supply of actuator fluid to the inspirator inlet by controlling the flow of the actuator fluid between the inlet and the outlet ports thereof a target pressure chamber and a sensed pressure chamber, in fluid communication with the second target port and the outlet port thereof, and a mechanism configured to move the secondary valve member in response to a pressure differential between the target and sensed pressure chambers; and e. a target pressure source in fluid communication with the target ports and the target pressure chambers of the primary pilot valve and the secondary pilot valve and adjustable to select a desired pressure to be maintained at the sensing point in the process fluid stream.

2. A pressure control system as claimed in claim 1, wherein the inlet port of the secondary pilot valve is adapted for connection to a supply of actuator fluid separate from the process fluid stream.

3. A process control system as claimed in claim 2, wherein the first and second target ports of the primary and secondary pilot valves are adapted for connection to a separate supply of fluid providing a pressure input.

4. A pressure control system as claimed in claim 3, wherein the primary pilot valve comprises a control portion including the target pressure and sensed pressure chambers, and a valve portion including inlet and outlet ports and the primary valve member, and wherein the primary pilot valve includes a diaphragm between the target and sensed pressure chambers.

5. A pressure control system as claimed in claim 4, wherein the primary pilot valve includes a pressure adjustment device for adjusting the pressure applied by the diaphragm.

6. A pressure control system as claimed in claim 5, wherein the mechanism of the primary pilot valve comprises a lever pivotally mounted to the valve and subject to movement of the diaphragm, and a shaft connected to the lever and to the primary valve member, whereby movement of the diaphragm of the primary pilot valve causes movement of the primary valve member.

7. A pressure control system as claimed in claim 5, wherein the secondary pilot valve includes a diaphragm between the target pressure and sensed pressure chambers.

8. A pressure control system as claimed in claim 7, wherein the secondary pilot valve includes a pressure adjustment spring and a pressure adjustment screw, for adjusting pressure applied to one face of the diaphragm of the secondary pilot valve.

9. A pressure control system as claimed in claim 1, 6 or 8, wherein the closure member of the pressure regulator comprises a diaphragm.

10. A pressure control system as claimed in claim 9, wherein the diaphragm of the pressure regulator is mounted substantially vertically.

11. A pressure control system as claimed in claim 1, 6 or 8, including an input for a target pressure, connected to the first and second target ports of the primary and secondary pilot valves, and including a stabilizing needle valve at least between the target pressure source and the second target port.

* * * * *